United States Patent [19]

Overdiek et al.

[11] Patent Number: 5,597,008
[45] Date of Patent: Jan. 28, 1997

[54] PRESSURE-LIMITING VALVE AND METHOD OF SETTING OPENING PRESSURE OF THE PRESSURE-LIMITING VALVE

[75] Inventors: Gerhard Overdiek, Friedrichsdorf; Hans-Jürgen Lauth, Usingen; Van D. Nguyen, Frankfurt; Randolf Körtge, Usingen, all of Germany

[73] Assignee: Luk Fahrzeug-Hydraulik GmbH & Co., KG., Bad Homburg, Germany

[21] Appl. No.: 420,549

[22] Filed: Apr. 12, 1995

[30] Foreign Application Priority Data

Apr. 12, 1994 [DE] Germany .......................... 44 13 190.9

[51] Int. Cl.$^6$ ............................ F16K 15/06; G01L 27/00
[52] U.S. Cl. ............................ 137/15; 137/540; 73/4 R
[58] Field of Search ........................ 137/15, 540; 73/4 R

[56] References Cited

U.S. PATENT DOCUMENTS

| 1,946,756 | 2/1934  | Oberg         | 73/4 R X   |
|-----------|---------|---------------|------------|
| 2,970,467 | 2/1961  | Pettibone     | 73/4 R     |
| 4,557,136 | 12/1985 | Greenhalf     | 73/4 R     |
| 4,646,556 | 3/1987  | Courcoux et al.| 73/4 R    |
| 4,761,999 | 8/1988  | Thompson      | 73/4 R X   |
| 5,139,047 | 8/1992  | Reinicke      | 137/540 X  |
| 5,275,036 | 1/1994  | Schulz et al. | 73/4 R     |

Primary Examiner—John Rivell
Attorney, Agent, or Firm—Anderson, Kill Olick P.C.

[57] ABSTRACT

A pressure-limiting valve including a housing, a valve seat located in the housing bore, a sealing element displaceable in the bore between a closed position in which it engages the valve seat, and an open position in which it is spaced from said valve seat, and a spring for biasing the sealing element to the closed position thereof, with the valve seat being pressed into the housing bore, with a valve seat position being adjustable during the pressing-in process, and with continuous control of pressure-in forces.

25 Claims, 5 Drawing Sheets

PRESSURE-LIMITING VALVE AND METHOD OF SETTING OPENING PRESSURE OF THE PRESSURE-LIMITING VALVE

BACKGROUND OF THE INVENTION

The invention relates to a pressure-limiting valve including a valve seat and a sealing element, both located in an inner space of the valve housing, and a spring for biasing the sealing element into an engagement with the valve seat, with the biasing force of the spring being adjustable to correspond to a desired opening pressure of the pressure-limiting valve.

The invention also relates to a method of setting the opening pressure of the pressure-limiting valve by adjusting the biasing force of the spring.

Pressure-limiting valves of this type are used in hydraulic delivery pumps, for example, in a hydraulic pump for delivering fluid to a power-assist steering gear of a motor vehicle. The purpose of providing pressure-limiting valves consists in by-passing excess hydraulic fluid or oil when a predetermined fluid pressure in the power-assist steering gear is exceeded, so that the power-assist would not exceed a predetermined threshold.

This conventional pressure-limiting valve includes a valve seat and a sealing element both located in an inner space of the valve housing, with the sealing element being spring-biased against the valve seat. The valve seat has a through-opening through which the hydraulic fluid flows for displacing the sealing element against the biasing force.

The sealing element usually includes a ball-shaped or conical sealing body, which engages the valve seat, closing the mouth of the through-opening. Conventionally, the valve seat is screwed into the valve housing displacing the sealing element and compressing the biasing spring. Thereby, the biasing force which is applied by the spring to the sealing element is adjusted.

The inner space of the valve housing has at least one bore, which communicates the inner space, in which the valve seat and the sealing element are located, and which has a valve outlet that communicates, for example, with a reservoir of the delivery pump.

In order for the pressure-limiting valve to function in a predetermined manner, i.e., to open when a predetermined pressure limit is exceeded, the pressure-limiting valve need be set to open at the predetermined pressure limit.

To this end, the valve seat is screwed into the valve housing to a predetermined position displacing the sealing element, together with the biasing spring, a distance corresponding to a predetermined preload of the spring.

The displacement threaded path of the valve seat is determined by using an appropriate number of adjusting washers, which are formed as U-washers, with which a distance between a stop provided in the valve housing and the locating face of the valve seat is adjusted.

By screwing-in the valve seat a pre-determined length, the spring is so preloaded that it applies a predetermined force to the sealing element for retaining the sealing element in engagement with the valve seat.

The sealing element is displaced away from the valve seat, against the biasing force of the spring, only after the oil pressure acting thereon reaches a predetermined value so that the valve becomes open. The oil, which then enters the valve inner space, can then flow to the reservoir.

The drawback of these conventional pressure-limiting valves consists in that the preloading of the spring is not very precise, because it is determined by the thickness of the adjusting washers and, thus, can be effected only in stages.

In addition, the use of adjusting washers complicates the adjusting process because, whenever one or several washers need be added or removed, the valve seat need be completely removed from the valve housing.

Accordingly, an object of the invention is a pressure-limiting valve which would have a simple structure and in which the adjustment of the biasing force of the spring can be effected with more precision than in conventional pressure-limiting valves.

Another object of the invention is a method of setting an opening pressure for the pressure-limiting valve according to the present invention.

SUMMARY OF THE INVENTION

These and other objects of the invention, which will become apparent hereinafter, are achieved by pressing the valve seat into the inner space of the valve housing with a controlled force, whereby the valve seat is continuously, steplessly, pressed in.

By advantageously controlling the pressure force, a precise positioning of the valve seat in the inner space of the valve housing becomes possible, while simultaneously, a precise press fit is obtained. Preferably, the valve housing is formed as a valve spool of, for example, a flow control valve, which valve spool is further displaceable against a biasing force of a spring in the housing of the flow control valve.

In a preferred embodiment of the invention, the valve seat is pressed into a socket, which serves as a housing of the pressure-limiting valve and which axially extends in the inner space of the valve housing. With this embodiment, it is advantageously possible, in particular, when the valve housing forms a valve spool of a flow control valve, to form the pressure-limiting valve as a separate unit with the valve seat being positioned in the socket by being continuously, steplessly, pressed in.

Such a pre-fabricated pressure-limiting valve may be mounted, without any problems, in different valve housings especially in valve spools. By separately producing the pressure-limiting valve, it is achieved that a very precise process of pressing the valve seat in and the simultaneous adjustment or setting of the biasing force of the spring need not be effected directly on the valve spool which has very sensitive sealing surfaces and even the minute damage of which, e.g., a scratch, may result in leakage losses.

By producing the pressure-limiting valve as a separate unit which is then inserted into the housing of an appropriate valve, an excessive stressing of the valve housing, which might have been caused by the very precise process of the pressing-in of the valve seat that usually is accompanied by large pressing forces, is avoided.

The press fit between the socket and the valve housing base does not require any further adjustment, and is effected rather easily with the application of relatively small pressure forces that would not cause an excessive stressing of the valve housing. The pressure forces required for pressing the socket into the valve housing are much smaller than those required for pressing the valve seat in.

An operation of a valving device with a pressure-limiting valve, which is located in a separate socket, provides an additional advantage that consists in that the pressure limit is determined only by the biasing force of the spring, which has been set or adjusted before mounting of the pressure-limiting valve in the valve housing.

The mounting of the socket in the valve housing does not influence the pressure-limiting characteristic of the pressure-limiting valve in any way. This results in a so-called 'fail-safe' pressure limitation, i.e., if the socket is improperly positioned in the valve housing, the actuating (opening) pressure of the pressure-limiting valve drops.

In another preferred embodiment of the present invention, it is contemplated that the valve seat and/or the socket be made of steel or aluminum, and the valve housing of aluminum. By appropriate selection of materials from which the separate, pressed-in parts are made and which may have different coefficients of thermal expansion, a reliable press fit can be obtained.

The press fit should be such that displacement of the valve seat and, thus, the alteration of the desired characteristics of the pressure-limiting valve are prevented at high operational temperatures, and pressures which can reach about 300° C. and 300 bar, respectively.

With the selection of a proper press fit, the valve housing can be made of aluminum. The selection of an appropriate press fit makes it advantageously possible, especially when the pressure-limiting valve housing is formed as a valve spool of a flow control valve, to form the housing of the flow control valve likewise of aluminum. In this case, the valve spool and the flow control valve housing would have the same coefficients of thermal expansion, and eventual jamming of the valve spool in the valve housing would be avoided.

It has been determined that when the valve seat is formed advantageously as a cylindrical body that fits exactly into a corresponding bore of the valve housing or the socket, the valve seat can easily be pressed to a selected depth, providing for precise setting or adjustment of the biasing force of the spring. When a cylindrical valve seat is used, the danger of a spring rebound is avoided, so that the valve seat can be better positioned and more precisely than, for example, a sphere, providing for a better press fit.

In yet another advantageous embodiment of the method of the invention, it is contemplated to apply a fluid pressure to the valve seat which is transmitted through an opening in the valve seat to the sealing element displacing the same, and to measure the fluid pressure, with the pressure force, with which the valve seat is being pressed in, being controlled in accordance with the measuring value of the fluid pressure.

To this end, a pressure sensor is provided at the valve inlet for determining the fluid pressure and for generating a measuring signal which is communicated to a controller that controls the operation of the pressure device. The pressure force for pressing in the valve seat can be provided by an electric motor which drives the pressure device, or by a hydraulic or pneumatic cylinder.

Thus, it advantageously becomes possible, during the process of setting the opening oil pressure, to precisely determine the acting oil pressure and communicate a signal representative of the instant oil pressure to a controller which controls the process of pressing the valve seat in. This insures an immediate precise stopping of the pressing process when the acting oil pressure is of a predetermined value. Thereby, the spring biasing force, which corresponds to the predetermined oil pressure, can be precisely adjusted by respective preloading of the spring.

At the moment at which the valve seat has been pressed in to a position in the inner space of the valve housing at which the spring is preloaded to such an extent that it biases the sealing element into engagement with the valve seat, the pressure sensor registers the pressure rise and communicates a respective signal to the controller which immediately stops the pressure device.

It is further advantageously contemplated, according to the invention, to plot the pressure force with which the valve seat is pressed in and the length of the path of the valve seat in the inner space of the valve housing on a force-path diagram and to compare the actual values with known reference values.

This insures that the press fit is within the allowable limits and would not change during operation, and permits to determine whether the valve seat tightening has taken place. This also insures that the parameters of the pressure-limiting valve do not exceed the predetermined limits. Thereby, the functional reliability of a valving device, which includes a pressure-limiting valve according to the present invention, with regard to its control, can be reduced.

As it has already been discussed above, the pressure-limiting valve and the method of its adjustment make a continuous and, therefore, very precise setting of the opening pressure possible. The conventional adjusting means, such as adjusting washers, are eliminated, which makes it possible to use a simplified automated process for assembling the valve.

Further, the invention permits to directly set the opening pressure during assembly of the pressure-limiting valve, as the additional unscrewing of the valve seat, which was required in the conventional pressure-limiting valves for adjusting the valve seat position, is no longer necessary.

Furthermore, the testing of the pressure-limiting valve, according to the present invention, because of the precise setting of the opening pressure, does not require a repeated use of a delivery pump.

BRIEF DESCRIPTION OF THE DRAWINGS

The objects and features of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
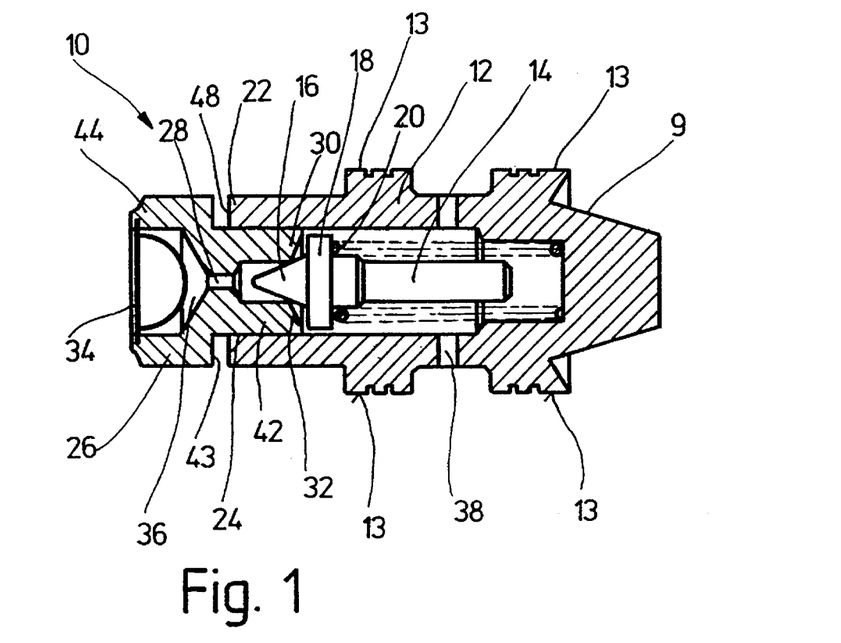
FIG. 1 is a cross-sectional view of a first embodiment of a valve spool with an integrated pressure-limiting valve according to the present invention.

FIG. 1 shows a valve spool 9, for example, of a flow control valve and including a pressure-limiting valve 10 according to the present invention.

The valve spool 9 forms a valve housing 12 of the integrated pressure-limiting valve 10. A sealing element 14 is displaceably arranged in the housing 12. The housing 12, as mentioned above, represents a valve spool of a flow control valve (not shown) and is axially displaceable in the inner space of the flow control valve. The circumference of the valve housing 12 forms a sealing surface 13. The sealing element 14 has a cone-shaped closing body 16 and a collar 18 which is engaged by a spring 20, the other end of which is supported on a bottom of a bore of the valve housing 12.

At the end 22 of the valve housing 12, there is provided an axially extending cylindrical opening 24. The cylindrical opening 24 receives a valve seat 26 having a through-opening 28. The opening 28 expands at an inner side 30 of the valve seat 26, forming a sealing step 32, which is engageable by the cone-shaped body 16 of the sealing element 14.

At the other side of the valve seat 26, the opening 28 expands forming an oil inlet 36 in which a screen 34 is located. The valve housing 12 further comprises a passage 38 which serves as an outlet. The passage 38 may, for example, communicate with a reservoir (not shown) of a hydraulic delivery pump.

The valve seat 26, which is advantageously cylindrically shaped, has smaller and larger diameter regions 42 and 44 defining a shoulder 43. The diameter of the smaller diameter region 42 corresponds to the inner diameter of the opening 24. The diameters of the opening 24 and the region 42 are so selected that the valve seat 26 is arranged in the valve housing 12 with a press fit.

The insertion of the valve seat 26 into the valve housing 12 will be explained in more detail further below, with reference to the block diagram shown in FIG.

An end surface 48 of the valve housing 12 defines a stop for the shoulder 43 of the valve seat 26.

Figure 2:
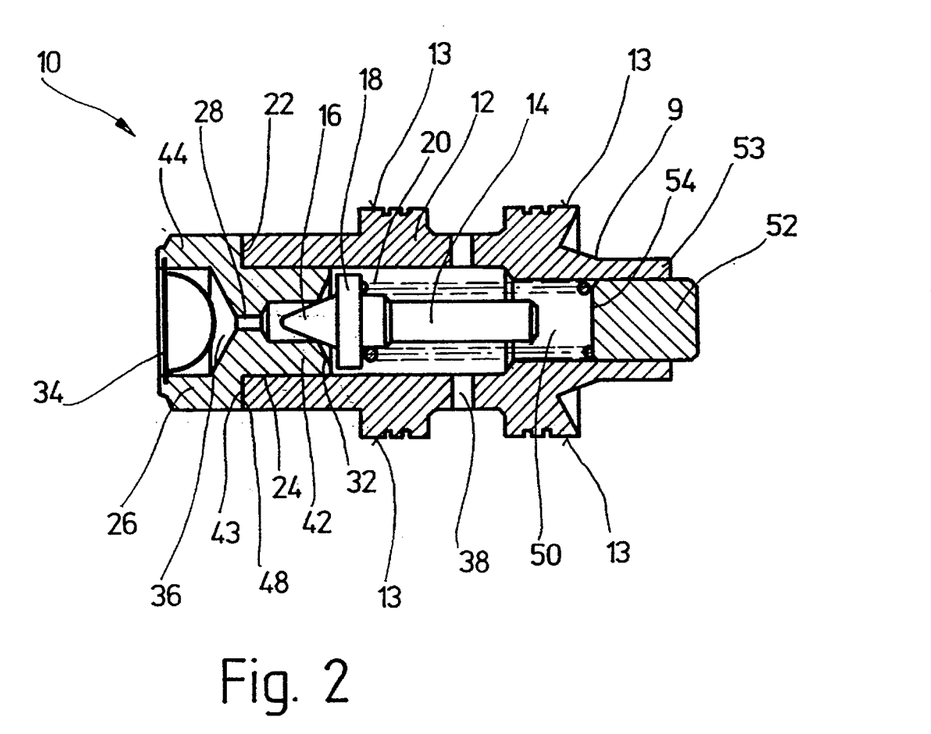
FIG. 2 is a cross-sectional view of a second embodiment of a valve spool with an integrated pressure-limiting valve according to the present invention.

FIG. 2 shows another embodiment of the pressure-limiting valve 10 which is basically similar to that of FIG. 1 and, in FIG. 2, elements common with respective elements of FIG. 1 are designated with the same reference numerals.

The pressure-limiting valve 10, which is shown in FIG. 2, has a through-opening 50 at the end 53 of the valve housing 12 which is remote from the valve seat 26. The opening 50 is closed with a plug 52 which is formed, for example, of aluminum. The diameter of the plug 52 so corresponds to that of the opening 50, that the plug 52 is received in the opening 50 with a press fit.

The spring 20 is supported, in FIG. 2, on the inner end surface 54 of the plug 52. At its other end, the spring 20 abuts the collar 18 of the sealing element 14.

Figure 3:
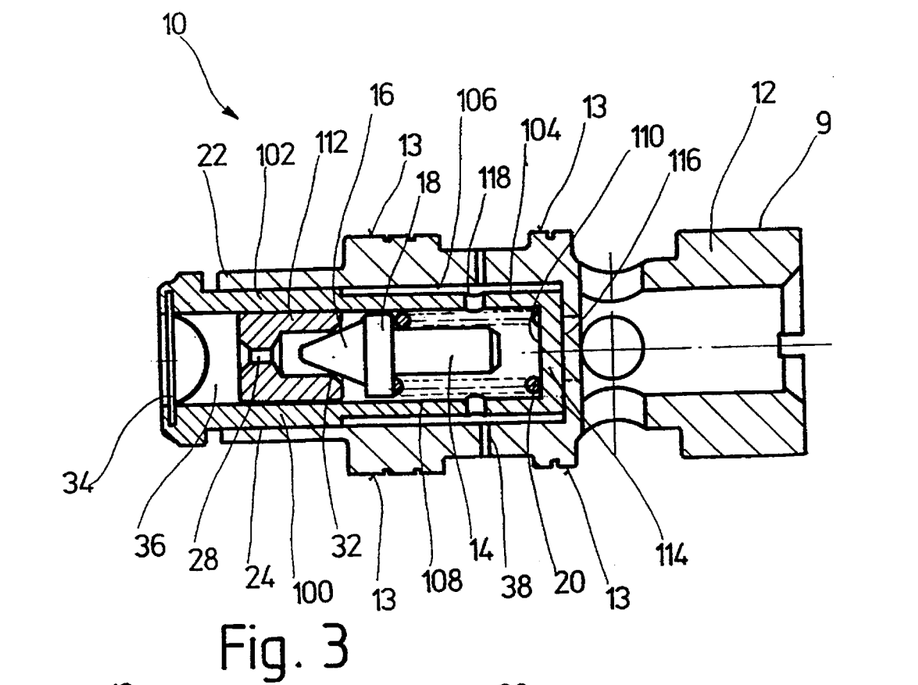
FIG. 3 is a cross-sectional view of a third embodiment of a valve spool with an integrated pressure-limiting valve according to the present invention.

Yet another embodiment of a pressure-limiting valve 10 according to the present invention is shown in FIG. 3. Here again, the same elements are designated with the same reference numerals as in FIGS. 1 and 2 and would not be discussed further.

In the embodiment of a pressure-limiting valve 10, shown in FIG. 3, a socket 100 is provided in the opening 24 of the valve housing 12, e.g., the socket 100 may be pressed into the opening 24. The socket 100 has a large diameter region 102 which is located in the valve housing 12 with a press fit. The smaller diameter region 104 of the socket 100 forms, together with the opening 24 of the valve housing 12, an annular space 106. The passage 38 communicates the annular space 106, e.g., with a reservoir (not shown) of a hydraulic delivery pump.

The socket 100 has a blind bore 108 in which the sealing element 14 and the spring 20 are located. The spring 20 is supported, at its opposite ends, against a bottom 110 of the blind bore 108 and the collar 18 of the sealing element 14. A valve seat 112 is pressed into the blind bore 108 of the socket 100. The insertion of the valve seat 112 into the blind bore 108 will be explained in more detail further below.

The spring 20 biases the closing body 16 against the sealing step 32 of the valve seat 112. At its outer open end, the socket 100 has a space for receiving the screen 34. The socket 100 extends along the entire length of the opening 24, and the base 114 of the socket 100 is supported against the bottom 116 of the opening 24. In its smaller diameter region 104, the socket 100 has a passage 118 which communicates the blind bore 108 with the annular space 106.

Figure 4:
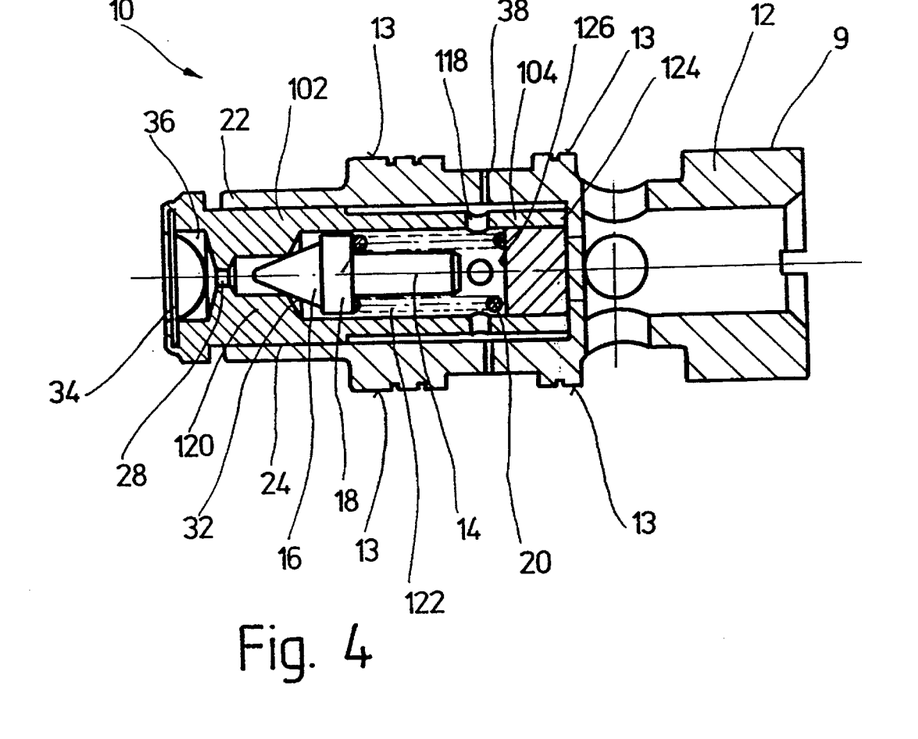
FIG. 4 is a cross-sectional view of a fourth embodiment of a valve spool with an integrated pressure-limiting valve according to the present invention.

A still further embodiment of the pressure-limiting valve 10 according to the present invention is shown in FIG. 4. Here also, the elements common with similar elements of the previous embodiments will be designated with the same reference numerals. In the embodiment of the pressure-limiting valve 10 shown in FIG. 4, as in the embodiment of FIG. 3, a socket 100 is arranged in the opening 24 of the valve housing 12.

In the embodiment of FIG. 4, the socket 100 forms a valve seat 120. To this end, the socket 100 is provided with a cylindrical inner space 122 in which the sealing element 100 and the spring 20 are located. The sealing step 32, against which the sealing element 14 is biased by the spring 20, is formed in the inner space 122. A plug 124 is pressed into the inner space 122, with the spring 20 being supported against the inner end surface 126. Again, the insertion of the plug 124 into the inner space 122 will be explained in more detail further below.

Figure 5:
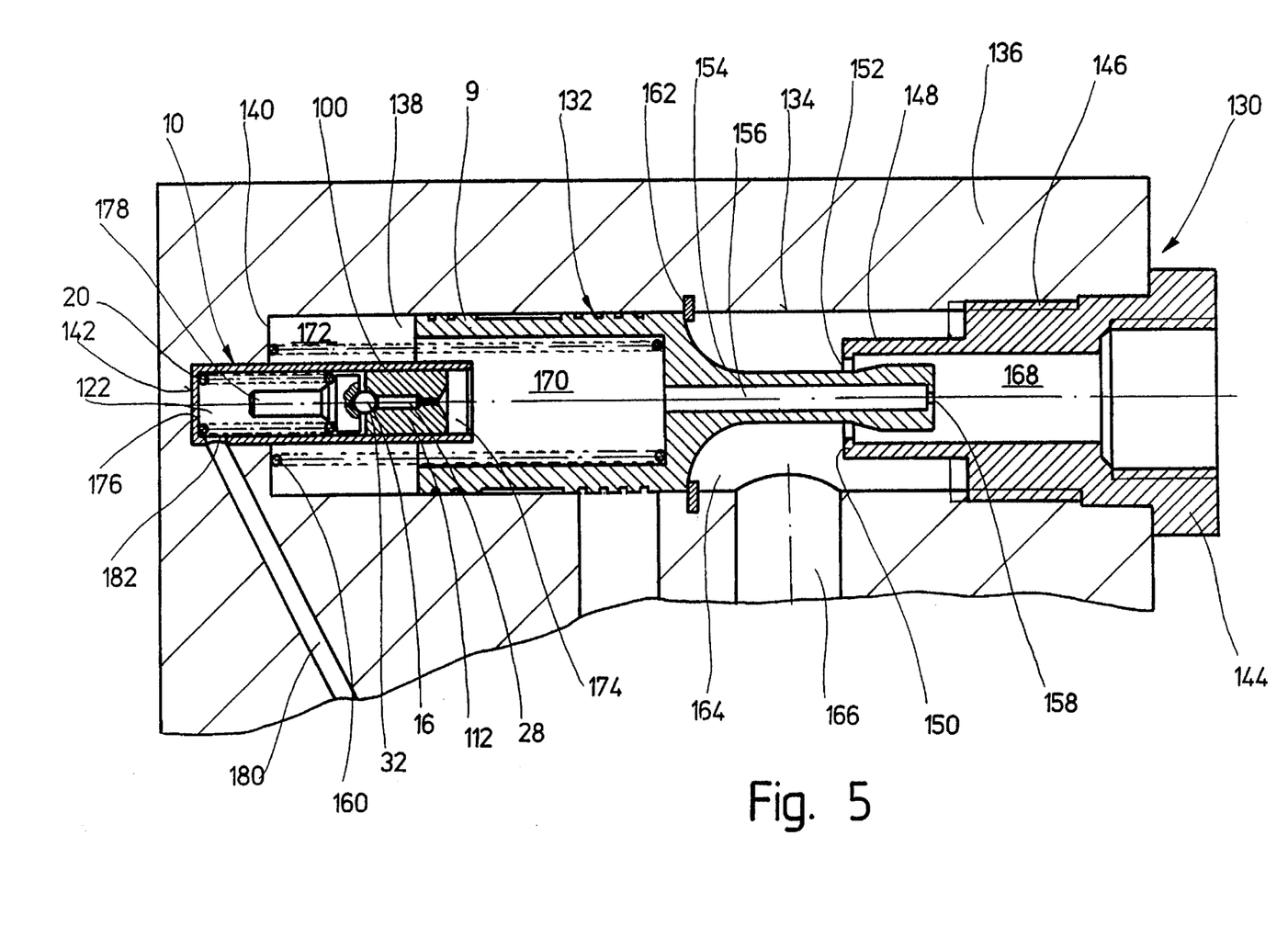
FIG. 5 is a cross-sectional view of a first embodiment of a valving device including a flow control valve and a pressure-limiting valve according to the present invention.
Figure 6:
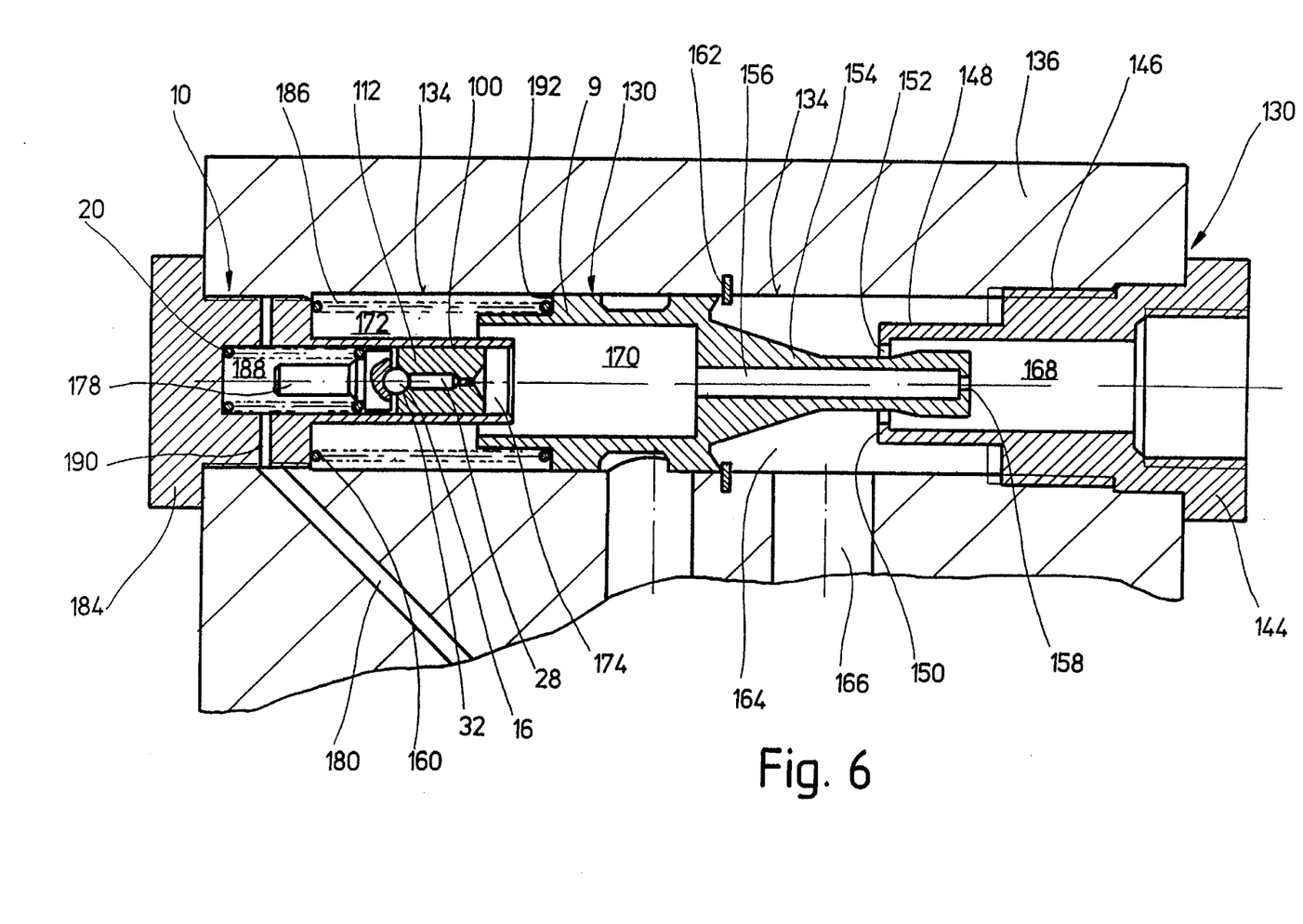
FIG. 6 is a cross-sectional view of a second embodiment of a valving device including a flow control valve and a pressure-limiting valve according to the present invention.

FIGS. 5 and 6 show complete valving devices or valves, which include a flow control valve and the pressure-limiting valve 10 according to the present invention. Despite some differences in the construction between the pressure-limiting valve 10, shown in FIGS. 5 and 6, and the pressure-limiting valves, shown in FIGS. 1–4, the main elements of the pressure-limiting valve 10, as shown in FIGS. 5 and 6, have substantially the same structure as the main elements of the pressure-limiting valves of FIGS. 1–4, and will be designated with the same reference numerals.

The valving device 130, shown in FIG. 5, includes a flow control valve 132 and a pressure-limiting valve 10. Both components of the valving device 130 are located in the same cavity 134 formed in a housing 136 of, for example, a hydraulic delivery pump.

The discussion of the structure and operation of the valving device 130 below is based on the assumption, for illustrative purposes only, that the valving device is used in a power-assist pump of a motor vehicle. It is to be understood, however, that the valve devices of the described type can be used in any hydraulic machine, that is, in both pumps and motors.

The cavity 134 in the housing 136 is defined by a bore 138 which is open at one end. In the bottom 140 of the bore 138, a pocket 142 for receiving the pressure-limiting valve 10 is formed. The opening of the bore 138 is closed with a closing plug 144 which is secured in the bore 138 by any appropriate means. In the valving device shown in FIG. 5, the plug 144 is held in the bore 138 by thread means 146. The plug 144 has an extension 148, which, for example, can have a cylindrical shape. An opening 152 is formed in the bottom 150 of the extension 148. A mandrel 154, which is concentric with the extension 148, extends through the opening 152 inside the extension 148. The mandrel 154 is defined by an extension of the body of the spool 9 of the flow control valve 132.

The mandrel 154 has a through-passage 156 which ends, at an end thereof remote from the body of the spool 9, with an orifice 158 having a predetermined cross-section. In the valving device shown in FIG. 5, the cross-section of the orifice 158 is smaller than the cross-section of the passage 156. The orifice 158 communicates the passage 156 with the interior of the extension 148.

The spool 9 is biased from left to right against a stop 162 by a resilient element which, in the disclosed embodiment, is formed as a helical spring 160. The stop 162 is formed, in the valving device shown in FIG. 5, by a snap ring, which is located in a groove formed in the wall of the housing 136 defining the cavity 134 and projects into the cavity 134.

The spool 9 can be formed as a hollow body in the interior of which a spring 160 is located. The spring 160 is supported, at its opposite ends, against the bottom of the spool 9 and the bottom 140 of the bore 138.

The outer diameter of the mandrel 154 is smaller than the diameter of the spool 9, so that a first pressure chamber 164 is formed in the region of the mandrel 154. A passage 166 opens into the first pressure space 164. The channel 166 communicates with a pressure side, e.g., a delivery side of a hydraulic delivery pump, for example, a power-assist pump.

The first pressure chamber 164 is connected with the inner space 168 of the plug 144 by the opening 152. The inner space 168 is connected with an actuator to which the oil from the delivery pump is supplied. The actuator may be formed by, for example, a steering gear of a motor vehicle. Thus, the pressure oil can be delivered from a power (assist) pump to the steering gear through the passage 166, the first pressure chamber 164, the opening 152, and the inner space 168 of the closing plug 144.

The mandrel 154 extends through the opening 152 into the inner space 168 of the plug 144. As a result, the pressure oil, which fills the inner space 168, can flow through the orifice 158 and the passage 156 into a hollow space 170 of the spool 9. The hollow space 170 communicates with a second pressure chamber 172 which is formed between the bottom 140 of the bore 138 and the spool 9. Thus, the pressure prevailing in the first pressure space 168 is communicated to the second pressure chamber 172.

The pressure-limiting valve 10, which is used in the valving device of FIG. 5, includes a cylindrical body formed as a hollow socket 100, the interior of which communicates with the second pressure chamber 172. The length of the socket 100 is so selected that the cavity 174 of the socket 100 is partially located in the hollow space 170 of the spool 9.

The spring 20, located in the hollow space 174 of the socket 100, is supported at its opposite ends against the bottom 176 of the cavity 174 and an abutment member 178 located in the cavity 174. The spring 20 provides a biasing force acting from left to right on the abutment member 178. The abutment member 178 presses the closing body 16, which is formed in the valving device of FIG. 5, as a ball, against a valve seat 112 located in the cavity 174 of the socket 100.

The valve seat 112 has, as described above, a passage 28. The valve seat 112 is pressed into the cavity 174 of the socket 100. The closing body, the ball 16, sealingly engages, under the action of spring 20, the mouth of the passage 28 which is defined by the sealing step 32. The passage 28 communicates with the hollow space 170 of the spool 9 and, thus, with the second pressure chamber 172.

The abutment member 178 is freely displaceable in the inner space 174 of the socket 100. The outer diameter of the abutment member 178 is smaller than the inner diameter of the cavity 174 of the socket 100. Thus, the pressure medium, which flows through the passage 28, can flow past the abutment member 178 without any hindrance.

The inner space 122 of the socket 100, which is closed by the valve seat 112, is connected for example, with the reservoir, actually with the inlet of the delivery pump, by a passage 180 which extends in the housing 136. The inner space 122 forms a third pressure chamber which communicates with the passage 180 through an opening 182.

The valving device 130 shown in FIG. 6 is, in many respects, similar to that of FIG. 5 and, in FIG. 6, elements common with those of FIG. 5 are designated with the same reference numerals, so that a reference to FIG. 5 becomes possible.

The structure of the valving device shown in FIG. 6 differs from that of FIG. 5 primarily in how the pressure-limiting valve is formed. In the valving device of FIG. 6, the pressure-limiting valve 10 has a housing formed as a closing plug 184 which closes, from the left end, the through-bore 186 which defines the cavity 134 of the housing 136, the right end of the through-bore 186 being closed by the closing plug 144, which is identical with the closing plug 144 of the valving device of FIG. 5.

The helical spring 160, which biases the spool 9 of the flow control valve 132 form left to right, is supported not against the bottom of the blind bore 138, as in FIG. 5, but rather, against the body of the closing plug 184. The spring 160 biases the spool 9 against the stop 162 formed as it was described with reference to FIG. 5.

The primary difference between the valving device of FIG. 6 and that of FIG. 5 consists in that the helical spring 160 in FIG. 6, which biases the spool 9 against the stop 162, is located, not in the inner space 170 of the spool 9, as in FIG. 5, but rather, outside thereof and acts on an abutment shoulder 92 of the spool 9. However, functionally, no differences exist between the valving devices of FIGS. 5 and 6.

In the valving device of FIG. 6, an extension of the housing 184 of the pressure-limiting valve 10 defines the socket 100, which projects through the second pressure chamber 172 and extends into the inner space 170 of the spool 9, with the inner space 174 of the socket 100 communicating with the second pressure chamber 172.

The third pressure chamber 188, formed in the pressure-limiting valve 10, communicates through a narrow passage 190 with the passage 180 which communicates, as it has already been discussed with reference to FIG. 5, with the reservoir or inlet of a hydraulic delivery machine, e.g., a power-assist pump.

In the valving device of FIG. 6, as shown and discussed above, the socket 100 and the housing 184 of the pressure-limiting valve 10 are formed as a one-piece part with the valve seat 112 being pressed into the socket 100. In the embodiments of a valving device, shown in FIGS. 5 and 6, providing a pressed-in valve seat 112 insures that the closing body 16 is biased by the spring 20 against the sealing step 32 defined by the valve seat 112.

The functioning of the pressure-limiting valves 10, shown in FIGS. 1–6, will be explained primarily with reference to the pressure-limiting valve shown in FIG. 1. The functioning of the pressure-limiting valve shown in FIGS. 2–6 is completely analogous to the functioning of the pressure-limiting valve of FIG. 1.

This should be apparent by the designation of similar elements with the same reference numerals despite some structural differences. The function of the valve spool 9 does not form part of the present invention and will not be discussed further.

A feedback conduit (not shown) communicates the oil inlet 36 with, for example, an oil-pressure conduit leading to a power assist system of a motor vehicle. If the oil pressure in this pressure conduit exceeds for some reasons, which will not be discussed here, the oil pressure which is communicated through the passage 28 of the valve seat 26 to the sealing element 14, would act on the sealing element 14. First, the oil pressure would lift the closing body 16 of the sealing step 32 and then, acting on the collar 18 of the sealing 14, would displace the sealing element 14 against the biasing force of the spring 20.

This would provide communication between the passage 28 of the valve seat 26 and the inner space of the valve housing 12 or the inner space 112 of the socket 100. This communication provides for pressure relief, and the oil behind the pressure element is under a reduced pressure and can flow, through the oil outlet 38, into the reservoir or to the inlet of the hydraulic delivery machine.

If the oil pressure in the steering system, due to the system conditions, is reduced to such an extent that it does not exceed the predetermined limit, the biasing force of the spring 20 would again bias the closing body 16 of the sealing element 14 against the sealing step 32 of the valve seat 26, and the pressure-limiting valve 10 would become closed.

From the foregoing conclusion, it should be clear that the calculation of the biasing force of the spring 20, which biases the closing body 16 of the sealing element 14 against the sealing step 32 of the valve seat 26, is of a paramount importance for proper operation of the pressure-limiting valve 10.

In the described pressure-limiting valve 10, the biasing force of the spring 20 is adjusted by positioning of the valve seat 26 in the opening 24, when the valve seat 26 is pressed into the opening 24 displacing the collar 28 of the sealing element 14 against the spring 20, which is supported at its opposite end, against the bottom of the opening 24.

In the embodiment of a pressure-limiting valve shown in FIG. 2, the biasing force of the spring 20 can be adjusted either by positioning of the valve seat 26 in the opening 24 and/or by positioning of the plug 52 in the opening 50. The pressing-in of the valve seat 26 and the plug 52 can be effected simultaneously from opposite sides, or by first pressing the valve seat 26 in until the flange 44 abuts the stop 48, and then by pressing in the plug 52.

The process of positioning of the valve seat 26 and the plug 52 is given by way of example only, and it is, of course, possible to alternatively press the valve seat 26 and the plug 52 or only one of these parts.

In the valve spool shown in FIG. 3, the valve seat 112, being pressed into the socket 100, will displace the sealing element 14 toward the bottom 110 of the blind bore 108, whereby the spring 20 is preloaded.

In the valve spool shown in FIG. 4, the preloading of the spring 20 is effected by proper positioning of plug 124 when the plug 124 is pressed in. The position of the plug 124 in the inner space 122 is determined by the desired preloading of the spring 20.

The preloading of the spring 20 can also be adjusted when a socket having a through-bore is provided, by pressing in from opposite sides, a valve seat and a plug. In this case, as it has already been described with reference to FIG. 2, by simultaneously pressing in from opposite sides the valve seat and the plug, or by first inserting either the valve seat or the plug, and then pressing in the other element which, in effect, determines the preload of the spring 20.

In FIGS. 3 and 4, the preload of the spring 20 and thus the adjustment of the pressure-limiting valve 10, is effected separately. That is, the insertion of the valve seat 112 and/or the plug 124 into the socket 100 is effected before the insertion of the socket 100 into the valve housing 12.

Thereby, it is achieved that the sensitive sealing surfaces 13 of the valve housing 12 are not loaded during preloading of the spring 20. This is because the insertion, by the pressing in of the socket 100 into the valve housing 12, requires a substantially lesser force than that necessary for the pressing of the valve seat 112 or the plug 124 into the socket 100.

A separately produced socket 100, which includes the pressure-limiting valve 10, can be combined with different valve housings. Therefore, the advantage of the structures shown in FIGS. 3 and 4 in comparison with those shown in FIGS. 1 and 2, consists in that a larger number of a particular socket can be prefabricated and be fitted with a pressure-limiting valve, which then can be inserted in different valve housings. Therefore, it is not necessary to provide a separate device for pressing in a valve seat and/or plug for each different valve housing.

In the valving devices shown in FIGS. 5 and 6, the adjustment of the pressure-limiting valve 10 can be effected independently of, for example, the flow control valve 132. This is because the pressure-limiting valve is a separate self-contained unit. Here, the valve seat can be pressed into the socket 100, according to FIG. 5, or be pressed into the closing plug 184 which includes the socket 100 formed as an extension of the closing plug body.

Figure 7:
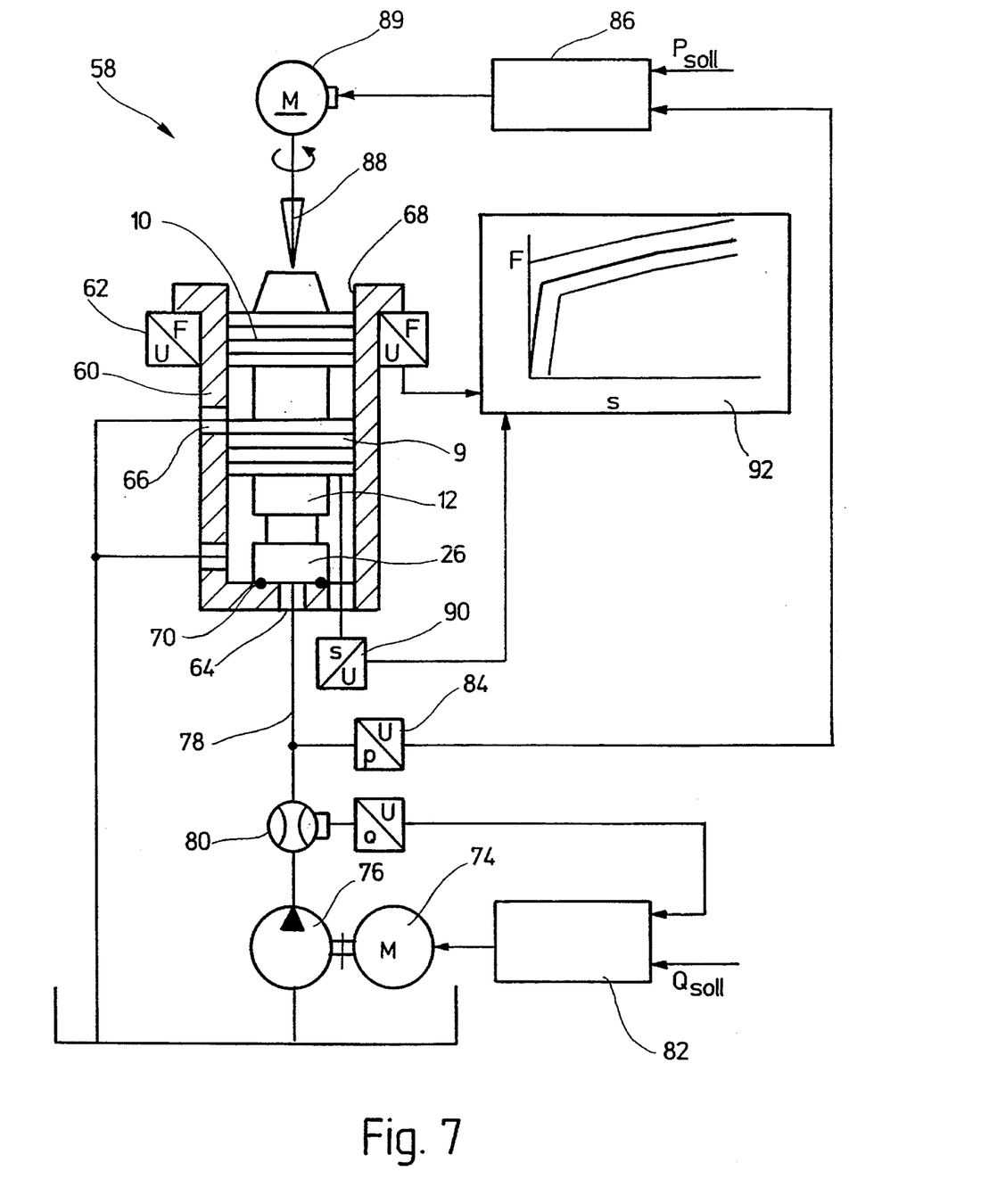
FIG. 7 is a block diagram illustrating a setting of an opening pressure of a pressure-limiting valve according to the present invention.

The adjustment of the preload of the spring 20 is effected, in accordance with a process shown in FIG. 7, when the valve seat 112 is continuously pressed into the socket 100. This process insures a very precise preloading of the spring 20 and thereby, a precise setting of the opening pressure of the pressure-limiting valve.

As to the valve spool 9, per se, it is not subjected to any stress or load during insertion of the pressure-limiting valve, contrary to what takes place during the insertion of the pressure-limiting valves in FIGS. 1 and 2. The position of the valve spool 9 is adjusted separately and relatively easily. Therefore, any damage of the sealing surfaces of the valve spool as a result of insertion, is excluded.

The method of the adjustment of the opening pressure will now be described with reference to FIG. 7, based on the adjustment of the opening pressure in the pressure-limiting valve shown in FIG. 1. The adjustment of the opening pressure in the pressure limiting valves, shown in FIGS. 2–6, is effected in the same manner. In FIG. 7, the valve spool 9 with the integrated pressure-limiting valve 10 is shown schematically, and the course of the adjustment process is described with reference to the corresponding block diagram.

The adjusting apparatus 58, which is shown in FIG. 7, includes a valve-receiving device 60 which is supported by a force measuring device 62, and includes an oil inlet 64 and an oil outlet 66. The valve-receiving device 60 has a bore 68 in which the pressure-limiting valve 10 is precisely received.

The sealing surfaces 13 of the valve housing 12 at that abut the wall of the bore 68. In order to keep the pressure force acting on the adjusting apparatus 58 as small as possible, an additional small diameter sealing 70 is provided at the base of the valve-receiving device 60.

When the pressure-limiting valve 10, together with the valve seat 26, is pressed against the sealing 70, the pressure oil cannot flow from the inlet 64 outwardly, that is, it cannot flow into the bore 68 itself.

At the same time, the sealing 70 limits the surface, which is subjected to the action of the pressure fluid, so that the pressure force of the pressure oil can be maintained at a level lower than the force that is used for pressing the valve seat in.

The adjusting apparatus further includes an oil pump 76 driven by a motor 74 and a device 80 for measuring the volumetric flow which is arranged in an inlet conduit 78. The volumetric flow measuring device 80 measures the output volume of the pump 76 and communicates it to a flow rate regulator 82, which controls the operation of the pump driving motor 74. As a result, the pump 76 supplies a predetermined amount of oil to the pressure-limiting valve 10.

A pressure sensor 84, provided directly at the inlet of the adjusting device 58, registers the oil pressure and communicates it to a controller 86, which controls the operation of the device 88, which effects pressuring of the valve seat in.

The controller 86, which controls the positioning of the valve seat, controls the operation of an electric motor 89 for driving the pressure device 88. Thus, the controller 86, in effect, controls the pressure device 88 which insures an immediate stop and actuation of the pressure device.

The adjusting apparatus 58 further comprises a path-measuring or position sensor 90. The force-measuring sensor 62 and the path measuring sensor 90 generate, respectively, during the insertion process, the pressure force and position analog signals which are plotted on a force-path diagram 92.

The additional control possibilities increase the reliability of the adjusting process, as the pressure force can be controlled in accordance with the displacement of the valve seat during the pressure-in process. Thereby, application of a larger force, which may have been caused by jamming of the valve seat or by non-conformity of respective tolerances of press fit of the valve housing 12 and the valve seat 26, is excluded.

By comparison of the force-path diagram 92 with a predetermined pattern, the deviation of parameters of one after another adjustable pressure-limiting valves can be determined. Thereby, categorizing of separate pressure-limiting valves into different classes is possible.

During the insertion process, the oil flow from the pump 76, which is driven by the motor 74, flows through the inlet conduit 78 and the inlet 64 of the adjusting device and acts on the pressure-limiting valve located in the bore 68 of the adjusting apparatus 58. The flow volume delivered to the pressure-limiting valve is controlled by the flow rate regulator 82.

Because the valve seat 26 already inserted into the valve housing 12 is not yet in its predetermined position, the resulting oil pressure is lower than the desired set pressure. The sealing element 14 compresses the spring 20, thereby the fluid is able to flow through the opening 38 to the outlet 66 of the adjusting apparatus 58.

With further insertion of the valve seat 26, the spring force of the spring 20, acting on the sealing element 13, increases. When the valve seat 26 reaches its predetermined position, the biasing force of the spring 20 has increased to a degree at which the oil pressure in the inlet conduit 78 reached a predetermined value. The oil pressure is registered by the pressure sensor 84 and is communicated to the position controller 86. This pressure is compared with the desired pressure, and the controller 86 controls the pressure device 88 in accordance with the comparison results. After the insertion process ends, the pressure-limiting valve is removed from the adjusting apparatus.

Generally speaking, the present invention provides a pressure-limiting valve in which, by controlling the process of pressing-in of the valve seat or the closing plug, the opening pressure of the pressure-limiting valve can automatically be continuously adjusted, and by controlling the pressed-in forces, a correct positioning of the valve seat is achieved.

The process of inserting a valve seat and/or a plug, according to the present invention, provides for cost-effective manufacturing of precise pressure-limiting valves.

Though the present invention has been shown and described with reference to the preferred embodiments, various modifications thereof will be apparent to those skilled in the art and, there-fore, it is not intended that the invention be limited to the disclosed embodiments or details thereof, and departures may be made therefrom within the spirit and scope of the appended claims:

What is claimed is:

1. A pressure limiting valve, comprising:

a housing having a bore;

a valve seat located in said bore;

a sealing element displaceable in said bore between a closed position in which it engages said valve seat, and an open position in which it is spaced from said valve seat; and spring means for biasing said sealing element to the closed position thereof, wherein said valve seat is pressed into said housing bore, with a valve seat position being adjustable during a pressing-in process, and with continuous control of pressure-in forces during the pressure-in process, whereby an opening pressure of said pressure-limiting valve, which results in displacement of the sealing element against a biasing force of the spring means, is set.

2. A pressure-limiting valve as set forth in claim 1, wherein the pressing-in of the valve seat is effected continuously.

3. A pressure-limiting valve as set forth in claim 1, wherein said valve seat has a cylindrical body.

4. A pressure-limiting valve as set forth in claim 1, wherein said valve seat has a smaller diameter region and a larger diameter region defining together a shoulder.

5. A pressure-limiting valve as set forth in claim 4, wherein said valve housing has an end surface forming a stop engageable by said shoulder of said valve seat.

6. A pressure-limiting valve as set forth in claim 4, wherein a biasing force of said spring means is determined by a position of said smaller diameter portion of said valve seat in said housing bore.

7. A pressure-limiting valve as set forth in claim 1, wherein said valve seat has an end surface, which is adjacent to said sealing element, and a recess formed in said end surface and defining a sealing step engageable by said sealing element.

8. A pressure-limiting valve as set forth in claim 1, wherein said valve seat has an axial through-opening ending in said sealing step.

9. A pressure-limiting valve as set forth in claim 1, wherein said valve seat has a plurality of diametrical steps corresponding to respective correspondingly spaced annular steps of said housing.

10. A pressure-limiting valve as set forth in claim 1, further comprising a socket axially extending in said housing bore, said valve seat being pressed into said socket.

11. A pressure-limiting valve as set forth in claim 10, wherein said socket has a blind bore in which said sealing element and said spring means are received, and an opening which communicates said blind bore with said housing bore.

12. A pressure-limiting valve as set forth in claim 1, further comprising a socket axially extending in said housing bore, and wherein said valve seat forms a part of said socket, and said socket includes a plug pressed into an end of said socket, which is spaced from the part of said socket forming the valve seat, said plug defining a blind bore in said socket for receiving said sealing element and said spring means, and having an inner end surface against which an end of said spring is supported.

13. A pressure-limiting valve as set forth in claim 10, wherein said socket is pressed into said housing.

14. A pressure-limiting valve as set forth in claim 12, wherein said socket is pressed into said housing.

15. A pressure-limiting valve as set forth in claim 10, wherein said socket is adapted to be received in a pocket of a housing of a valving device.

16. A pressure-limiting valve as set forth in claim 10, wherein said socket is formed as an extension of a closing plug which closes a bore of a housing of a valving device.

17. A pressure-limiting valve as set forth in claim 1, wherein said valve seat is formed of one of steel and aluminum, and said housing is formed of aluminum.

18. A pressure-limiting valve as set forth in claim 10, wherein said socket is formed of one of steel and aluminum and said housing is formed of aluminum.

19. A method of setting an opening pressure of a pressure-limited valve including a housing having a bore, a valve seat located in the bore, a sealing element displaceable in the bore between a closed position in which it engages the valve seat, and an open position in which it is spaced from the valve seat, and spring means for biasing the sealing element to a closed position thereof, said method comprising the steps of:

pressing-in of the valve seat into the housing bore; and continuously controlling pressing-in forces during a pressure-in process, whereby an opening pressure of the pressure-limiting valve, which results in displacement of the sealing element against a biasing element against a biasing force of the spring means, is set.

20. A method as set forth in claim 19, further comprising the step of applying fluid pressure to the sealing element for displacing same against the spring means, said controlling step including determining a pressure force with which the valve seat is pressed into the housing bore in accordance with said fluid pressure.

21. A method as set forth in claim 20, further comprising the steps of measuring a flow rate of a fluid flow which displaces the sealing element, and adjusting the flow rate to a pre-determined value.

22. A method as set forth in claim 20, wherein said controlling step includes providing a pressure sensor at an inlet of said pressure-limiting valve for measuring the fluid pressure acting thereon and generating a control signal, communicating the control signal to a pressure force controller for correspondingly controlling a pressure device for pressing-in the valve seat, and turning said pressure device off when a predetermined fluid pressure at the inlet of said pressure-limiting valve is achieved.

23. A method as set forth in claim 20, further comprising the steps of determining displacement of said valve seat during its pressing-in, and plotting a diagram pressure force-path displacement of the pressing-in process.

24. A method as set forth in claim 23, further comprising the step of comparing the pressure force-path displacement diagram with reference-limiting values.

25. A method as set forth in claim, 19 wherein the pressure-limiting valve includes a socket received in the housing bore, and wherein said pressing-in step comprises pressing-in of the valve seat into the socket.

* * * * *